United States Patent [19]

Haave et al.

[11] Patent Number: 5,367,330
[45] Date of Patent: Nov. 22, 1994

[54] PAY-PER-VIEW TELEVISION DELIVERY SYSTEM

[76] Inventors: Luther Haave, 5224 - 143 Street, Edmonton, Alberta, Canada, T6H 4E2; Carle T. Proskin, 7711 Canada Way, Burnaby, British Columbia, Canada, V3N 1K4

[21] Appl. No.: 739,153

[22] Filed: Aug. 1, 1991

[51] Int. Cl.⁵ .............................................. H04H 1/00
[52] U.S. Cl. ...................................... 348/7; 455/5.1; 455/6.1; 455/53.1
[58] Field of Search ................ 455/2, 4.1, 4.2, 5.1, 455/53.1, 6.1, 3.1; 358/84, 86; 348/6, 7

[56] References Cited

U.S. PATENT DOCUMENTS

| | | | |
|---|---|---|---|
| 3,211,830 | 10/1965 | Sargent, Jr. | 358/86 |
| 3,278,677 | 10/1966 | Fannoy | 358/86 |
| 3,757,225 | 9/1973 | Ulicki | 325/308 |
| 4,264,924 | 4/1981 | Freeman | 358/86 |
| 4,381,522 | 4/1983 | Lambert | 358/86 |
| 4,450,477 | 5/1984 | Lovett | 358/86 |
| 4,506,387 | 3/1985 | Walter | 455/612 |
| 4,521,806 | 6/1985 | Abraham | 358/86 |
| 4,554,579 | 11/1985 | Citta | 358/86 |
| 4,567,512 | 1/1986 | Abraham | 358/86 |
| 4,584,603 | 4/1986 | Harrison | 358/86 |
| 4,590,516 | 5/1986 | Abraham | 358/86 |
| 4,675,732 | 6/1987 | Oleson | 358/349 |
| 4,694,490 | 9/1987 | Harvey et al. | 380/20 |
| 4,734,764 | 3/1988 | Pockock et al. | 358/86 |
| 4,761,684 | 8/1988 | Clark et al. | 358/86 |
| 4,769,833 | 9/1988 | Farleigh et al. | 379/105 |
| 4,792,849 | 12/1988 | McCalley et al. | 358/86 |
| 4,852,154 | 7/1989 | Lewis et al. | 379/105 |
| 4,860,123 | 8/1989 | McCalley et al. | 358/342 |
| 4,866,787 | 9/1989 | Olesen | 455/3 |
| 4,890,320 | 12/1989 | Monslow et al. | 380/10 |
| 4,893,248 | 1/1990 | Pitts et al. | 364/464.01 |
| 4,920,432 | 4/1990 | Eggers et al. | 360/33.1 |
| 4,947,244 | 8/1990 | Fenwick et al. | 358/86 |
| 4,965,825 | 10/1990 | Harvey et al. | 380/9 |
| 5,099,319 | 3/1992 | Esch et al. | 455/53.1 |
| 5,172,413 | 12/1992 | Bradley et al. | 358/86 |

OTHER PUBLICATIONS

"Pay per View Multimedia Record, Playback and Barker System," Viewer's Choice Canada, Jun. 1991 (brochure).

Primary Examiner—Reinhard J. Eisenzopf
Assistant Examiner—Chi Pham
Attorney, Agent, or Firm—Millen, White, Zelano & Branigan

[57] ABSTRACT

Method and apparatus are provided for controlling and delivering television programming from a control station to one or more substations, which in turn transmit television programming to remote receiving locations on a pay-per-view basis. Programming is originated and delivered from the control station to record and playback devices at the substation. The record, playback and transmission of the programming at the substation is remotely controlled from the control station in accordance with schedule information generated at the control station. Similarly, scrambling and anti-copy devices at the substation can be remotely controlled in accordance with the schedule information.

11 Claims, 5 Drawing Sheets

PAY-PER-VIEW TELEVISION DELIVERY SYSTEM

FIELD OF THE INVENTION

The present invention is directed to a method and apparatus for controlling and delivering television programming from a central station to one or more affiliated, but remote substations, which in turn deliver television programming to remote subscriber receiving locations, typically on a pay-per-view basis.

BACKGROUND OF THE INVENTION

Pay-per-view television programming has been available to cable television subscribers in North America for more than ten years. However, due to many practical difficulties, pay-per-view programming has not been widely accepted.

In the early days of pay-per-view television, local cable television operators generally contacted a number of program suppliers, obtained copies of the programs and scheduled and delivered programming to subscribers on a pay-per-view basis in accordance with revenue splits negotiated with each supplier. The programming would generally be stored at the cable headend for playback on a number of possible sources, including video tape or video cassette recorders, video disc players and the like. The programming would be delivered, on a pay-per-view channel to subscribers possessing addressable cable equipment, in response to orders placed by the subscribers. Known addressable cable equipment include addressable cable converter systems, addressable cable interdiction systems and addressable tap or trap systems.

Eventually, "middleman" networks evolved to deal with the program suppliers and to make programming available to a multiplicity of cable operators. These pay-per-view networks originated scrambled satellite feeds for pickup by participating or affiliated cable operators. With satellite delivered programs, the creation of monthly programming schedules became necessary. The schedules rotated programming from a number of program suppliers through a number of available monthly time slots. The pay-per-view schedules which resulted were not unlike the schedules of monthly subscription pay television, except that programs were released by suppliers to pay-per-view networks a number of months before the same programs were available to monthly subscribers. Subscribers needed to overlay their personal schedules with that of the network in order to find a convenient time to buy. Fixed monthly schedules did not allow for variation of schedules in different communities or in response to viewer preferences.

Several pay-per-view systems are proposed in the patent literature. U.S. Pat. No. 4,381,522, issued April 1983, to Lambert discloses a television system of the first type described above. At the cable television headend there are a number of pre-loaded video tape, disc or film players which are actuated by a minicomputer to transmit television programming over a cable channel in response to a computer generated schedule. The schedule is generated in response to signals transmitted from home viewers by telephone.

There are difficulties with the Lambert system. While the schedule is responsive to viewers' preferences, the system cannot manage community pay-per-view television. As soon as the system has received a number of program requests for a particular start time equal to the number of channels available on the system for this type of programming, others wishing to use the system have to choose between watching a program (and a start time) chosen by someone else or submitting a personal request for future consideration. Such a system does not have the potential to maximize the number of users who would purchase pay-per-view programming. With program scheduling being determined on a first-come-first-served basis, callers requesting a program of interest to few others could determine what programs were playing at what times. Even though more people might be interested in viewing a different program at that time, the channel capacity or time slots available and the random nature of the scheduling would likely yield poor overall usage rates for the system.

U.S. Pat. Nos. 4,694,490, issued September 1987, 4,704,725, issued November 1987, and 4,965,825, issued October 1990, to Harvey et al. propose far-reaching systems for communicating programming. The systems utilize encrypted signals in broadcast programming, which signals include user specific information which can be displayed or used to control receiver apparatus at the user location. Although far reaching, many practical aspects of broadcast and receiving technology make implementation into existing television transmission systems problematic.

Another viewer specific broadcasting system is disclosed in U.S. Pat. No. 4,450,477, issued May 1984, to Lovett. The system is designed to allow viewers selective access to television information from large databanks on request. In response to viewers' requests to the cable headend station, a control station sends uniquely modulated carrier frequencies with the selected information to the individual viewer, whose television set is tuned to that carrier frequency. Here again, the system is not practical for pay-per-view television to a large community.

SUMMARY OF THE INVENTION

The inventor of the present pay-per-view system recognized the above-described advantages of past systems and the following needs for a better system. Firstly, there is a need for a pay-per-view system which can readily be incorporated into existing common carrier or closed circuit transmission systems. Secondly, there is a need for a pay-per-view system which would provide both programming and scheduling responsive to the tastes and needs of the subscribers in each particular closed circuit system. A pay-per-view system should provide program choices and schedules responsive to the characteristics of the subscribers to that system, including demographic characteristics, ethnic background, and work, leisure and viewing habits. If usage of a system is to be maximized, subscribers should not be expected to adapt their personal schedules and tastes to conform to a satellite delivered service which provides the same programming to numerous communities in several different time zones. The system should be able to respond to subscriber usage. Instead of making programming and scheduling decisions sixty days or more in advance and then running the programming regardless of the number of subscribers using the service, program choices should be frequently and regularly monitored and altered to reflect usage patterns in the community.

The system of the present invention was devised to meet the above needs. In one broad aspect, the invention provides an apparatus for controlling and delivering television programming to one or more television substations from a control station, wherein each substation transmits television programming on one or more channels a program schedule on a separate barker channel to a plurality of remote subscriber receiving locations. The apparatus includes, at the substation, means for receiving television programming, a plurality of television program record and playback means, audio and video transmitting means to transmit the television programming from the record and playback means over one or more channels to the remote subscriber locations, computer means, and control interface means connected to the computer means to switch the record and playback means and the transmitting means in response to signals from the computer which are indicative of the record and playback schedule information. The apparatus further includes, at the control station, audio and video transmitting means for transmitting television programming to the substation to be recorded on the record and playback means; and computer means for generating the record and playback schedule information. Data communication means are also included for transferring signals indicative of the record and playback schedule information and the playback schedule between the two computers.

Another broad aspect of the present invention provides a method of controlling and delivering programming to a television transmission substation from a control station, wherein the substation transmits television programming on one or more channels and a program schedule on a separate barker channel to a plurality of remote subscriber receiving locations. The method comprises the steps of:

a) transmitting television programming from the control station for reception on receiving means at the substation;

b) recording the television programming on one or more audio video record and playback means at the substation;

c) generating record schedule information on a first computer means at the control station;

d) generating playback schedule information on the first computer means at the control station;

e) transmitting data signals indicative of the record and playback schedule information and of the playback schedule from the control station to a second computer means at the substation;

f) controlling the record and playback of the audio and video record and playback means at the substation in accordance with the record and playback schedule information transmitted from the control station;

g) transmitting the television programming from the substation to the subscriber receiving locations in accordance with the playback schedule information on the one or more channels;

h) transmitting information indicative of the playback schedule in the form of one or both of text and graphics from the substation to the subscriber receiving locations on the separate barker channel.

In accordance with the above apparatus and method, the present invention provides a pay-per-view television system wherein programming can be originated and scheduled by a network control station for a multiplicity of affiliated substations. The network station is able to supply different programming to different affiliate substations, who themselves may be offering a different number of channels of pay-per-view programming. The network station is able to change the programming schedule on a weekly or other basis and use a different playback schedule for each affiliate substation, one that is most likely to generate the highest possible buy rates. Up to the minute information on buy rates or programming recommendations can be sent from each affiliate to the network, allowing the network to consider programming scheduling changes, and to relay the buy rates to the movie studios.

DETAILED DESCRIPTION OF THE PREFERRED EMBODIMENTS

The programming delivered in accordance with this invention is typically television programming which is ultimately to be delivered from the substations to individual remote receiving locations, typically home subscribers, on a pay-per-view basis. Pay-per-view delivery implies that the remote receiving locations are equipped to allow them to place an order for a particular television program and the substations are equipped to selectively deliver the program requested and bill the subscriber for that request. This aspect of pay-per-view equipment is state of the art in the industry. Typically, the remote receiving locations include addressable scrambling decoders which allow the substation to selectively descramble the requested programs. The substations are equipped to take orders from the remote receiving locations by, for example, telephone lines, computerized, voice response telephone answering systems (ARU or VRU), automated telephone number identification (ANI) systems or through two way cable systems that have the capability of processing subscriber pay-per-view orders entered on a converter remote control device in the subscriber's location.

Figure 1:
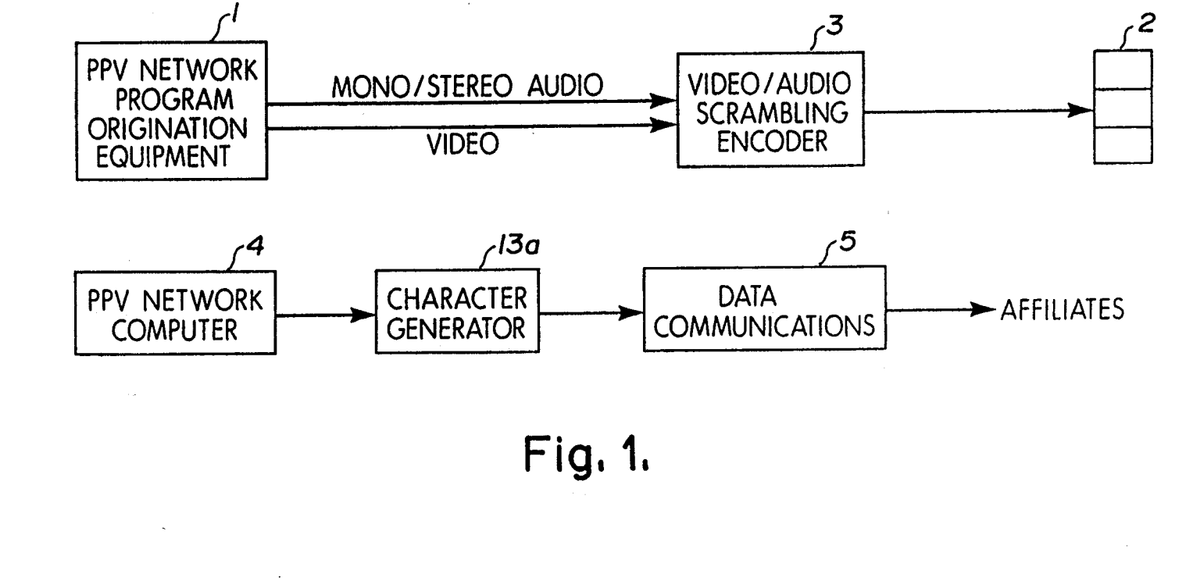
FIG. 1 is a block diagram of the arrangement of the program and scheduling origination equipment at the control station.

FIG. 1 illustrates schematically the apparatus of the pay-per-view system which is located at the network control station. The apparatus includes program origination equipment 1, such as videotape recorders, cassette playback equipment or live or remote broadcast equipment. The control station transmits or routes the originating audio and video television signal to a common carrier or closed circuit delivery system 2, which could be a satellite transponder or microwave, fibre or cable network, that is accessible to each of a plurality of affiliated television substations (referred to herein as substations, affiliates locations or sites). Preferably, the originating signal is transmitted on a satellite transponder.

It will be understood herein that any reference to an audio signal implies either a stereo or mono signal. It should also be understood that, while the television programming is preferably transmitted to the substation by common carrier or closed circuit delivery systems, it is conceivable, and within the scope of this invention, that the programming could be transmitted in part or in whole in other ways, such as by overnight courier delivery of pre-recorded tapes. Maximum benefit of the apparatus of this invention utilizes common carrier or closed circuit transmission of programming such that the record and playback at the substation are remotely controlled by the control station.

The originating signal is preferably secured for transmission by passing it through a standard video and/or audio scrambling encoder 3. Exemplary scrambling encoders include the Oak ORION and the General Instrument VCII systems.

Also located at the control station is a computer 4 (the network computer) which, as set out in detail hereinafter, is programmed to control the record and playback of the transmitted television programming at the substation through record schedule information and playback schedule information generated at the network computer. The network computer 4 is connected to a standard data communications network 5 to provide data communication with each of the substations. The communications network 5 may include a dial up modem to allow either the control station or substation to initiate communication. A dedicated two way data circuit could be used. Alternatively, a one way data sub-carrier could be used, with return communication to the control station being achieved by dial up modem.

Figure 2:
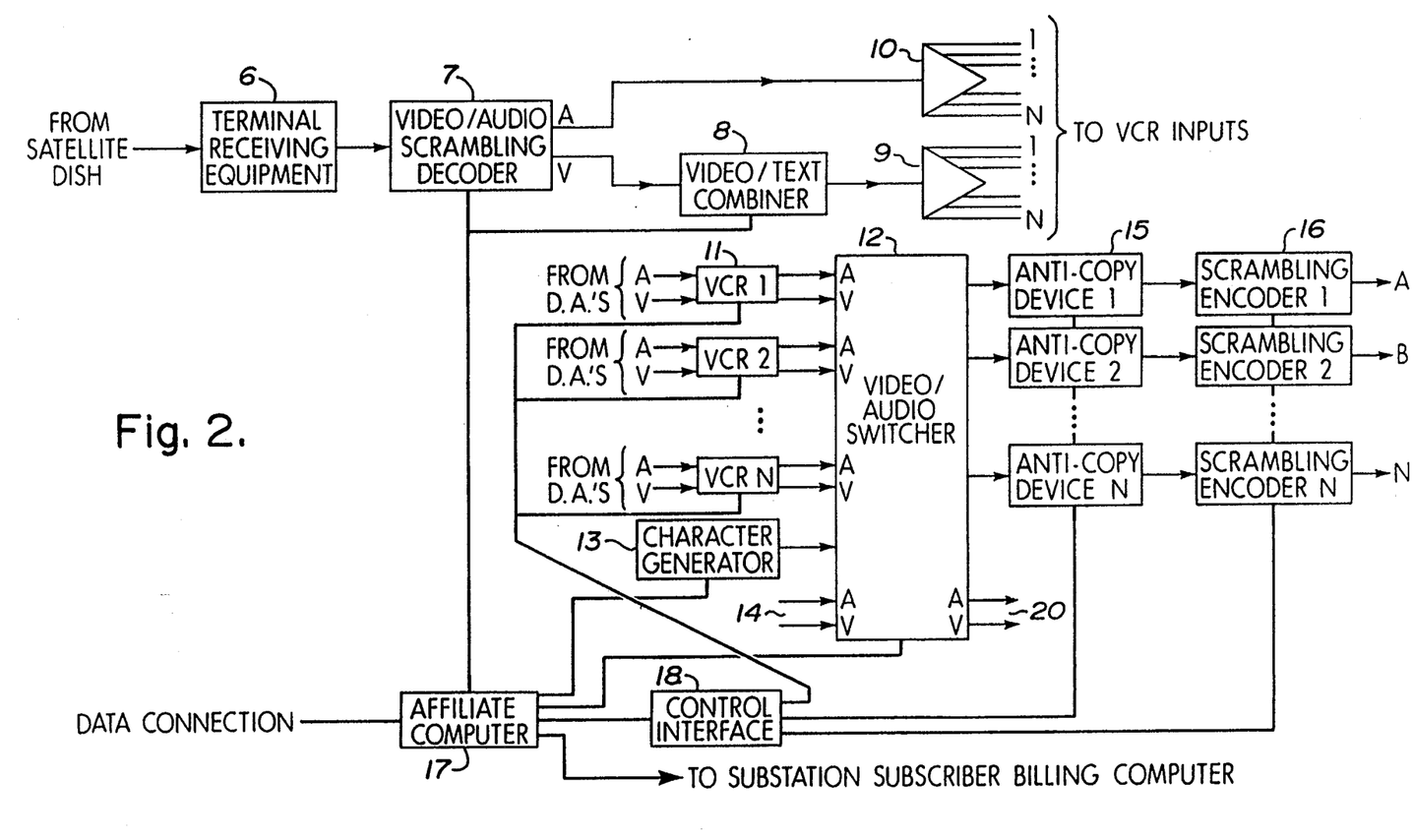
FIG. 2 is a block diagram of the arrangement of the automated program recording and transmitting equipment at the television transmission substation.

FIG. 2 illustrates the apparatus located at each remote television substation. The originating audio and video television signals from the control station are received by audio and video terminal equipment 6. The terminal equipment 6, well known in the broadcast industry, is capable of receiving audio and video transmissions from a common carrier or closed circuit transmission system such as a satellite transponder. In the event that the incoming signal has been scrambled, the signal is routed through a signal descrambler 7, also well known in the industry.

The video signal is preferably routed through a video text combiner 8, which combines or superimposes software generated text and/or graphics with the video signal. Such text or graphics might constitute, for example, schedule or ordering information specific to the substation which the network or substation may wish to introduce, on the tapes being recorded for subsequent playback on the barker or pay-per-view channels (discussed hereinafter). Such video text combiners are standardly available, for instance as a card to be inserted in a personal computer. Exemplary video text combiners include the Targa 16+, available from Truevision, Ill., and the VGA PRODUCER, available from Magni Systems Inc., Beaverton, Oreg.

The video and audio signals are then separately routed to distribution amplifiers (D.A.'s) 9 and 10. The amplifiers 9, 10 have a plurality of outputs in order to send separate signals to the inputs of a plurality of record and playback means, typically videotape or videocassette recorder/players 11. For convenience, these record and playback means are referred to hereinafter as VCRs, but it will be understood that this term includes VTRs and video disc players, subject to the technological problems outlined below in respect of recording on video disc players.

The number of VCRs 11 included in the system is a matter of choice and will vary primarily with the number of television channels to which programming is to be supplied. In the case of five programmed pay-per-view channels A-D, ten VCRs 11 have been found to be desirable. The type of VCRs used can vary widely. The VCRs must be capable of having the basic transport functions (play and stop, play and rewind, record and stop, and record and rewind) remotely controlled by standard electronic or data signals. Any format can be used, for instance VHS, S-VHS, 8 mm, D2 etc. An exemplary video cassette recorder/player is the Panasonic AG 5200 player/recorder. An exemplary video disc player is the Pioneer LDV 8000.

As indicated above, a video disc player (VDP) can be used as the playback means. However, current technology in respect of VDPs does not provide for easy recording. Thus programming available on VDPs can be played back from a VDP at the substation, with copies of the programming being transmitted to the substation, for instance by overnight courier delivery. Playback of the VDP can be remotely controlled in response to the playback schedule information from the control station. If record technology on video discs is readily available, video disc record/players can be substituted for the more preferred video cassette recorder/players, with both the record and playback functions being remotely controlled from the control station.

The audio and video outputs of the VCRs 11 are routed to the inputs of an audio and video routing switcher 12. The switcher 12 must be capable of handling the number of VCRs 11 and should preferably have further inputs for a character generator 13 (to be hereinafter described) and other sources 14 of pay-per-view programming, such as live closed circuit events. The switcher 12 provides a number of independent outputs at least as great as the number of pay-per-view channels A, B, C, D, etc., plus a further output for a barker channel which, as described hereinafter, provides for transmission of the playback schedule. The switcher 12 must also be capable of being remotely controlled by electronic or data signals from a computer, as set out below. An exemplary switcher is available from Headco (Model 16 X 8 AVS) of California, U.S.A.

Each pay-per-view channel video output from the switcher 12 is preferably routed through an anti-copy device 15 that processes a standard video signal by adding signal components that are designed to interfere with the circuitry in a standard home VCR. If an attempt is made to record a signal that has been processed in this fashion, the result will be a recording that is degraded or unusable. The anti-copy device 15 must also be capable of having its circuitry toggled on or off by remote control with electronic or data signals. Macrovision of California, U.S.A. provides an exemplary anti-copy device (Model Macrovision ACP 170P). Anti-copy technology of this nature is not essential to the invention, but is preferred in order to encourage movie studios and networks to provide early release television program titles for pay-per-view. Remote control of the anti-copy device 15 provides for selective use of the anti-copy device for example on programs whose release or broadcast may require this feature.

Each of the pay-per-view channel output signals is routed to standard and well known elements of a subscriber distribution system. As set out above, the affiliate substation will possess the necessary and known equipment to collect subscriber orders, authorize individual descramblers at the remote receiving locations and bill the subscribers for the ordered programming. The subscriber distribution system will include addressable scrambling encoders. In FIG. 2, these encoders are shown at 16. Each of the pay-per-view channel output signals is routed through an encoder 16 in order to limit the reception of the pay-per-view signal to subscribers who have ordered a particular channel at a particular time.

As set out above, the apparatus at the affiliate substation is remotely controlled from the control station. An affiliate computer 17 is provided with data communication, as set out above, with the network computer 4. The affiliate computer 17 is programmed as set out in detail hereinafter. As shown in FIG. 2, the affiliate computer 17 is connected to the video text combiner 8 and the switcher 12 for direct, remote control therefrom.

A control interface 18 is connected to the affiliate computer 17 and processes the software commands generated and configures output commands to control other equipment. The software commands are generated in response to the record schedule information and the playback scheduling information from the network computer 4.

Connected to the control interface 18 for control in this manner are the VCRs 11, anti-copy devices 15 and the scrambling encoders 16. As will be understood by persons skilled in the art, the control interface 18 functions to route signals from the affiliate computer 17 to the particular device to be controlled in a format that will be recognized by the particular device as the appropriate external signal required to initiate a command. Some devices may require a contact closure, contact interrupt or a certain voltage level to initiate the desired command. The control interface 18 provides such signals to each device. For instance, in the case of VCRs and VDPs, most manufacturers provide either standard serial or parallel interfaces that can be used for control of the basic transport functions. In the most preferred version of the present invention, VCRs provided with serial ports are used. A parallel card within the affiliate computer 17 produces TTL level signals which are converted to TTL level serial signals to control the particular above-mentioned VCRs 11 by a serial interface card in the control interface 18. The serial command is then routed through a relay switcher in the control interface 18 to the appropriate VCR. An exemplary control interface device of this nature is available from Nexus Display Systems Corp., Burnably B.C., Canada (NEXUS VCR INTERFACE CHASSIS). However, as explained above, a suitable control interface can be custom configured by one skilled in the art once the specifications of the particular devices to be controlled are known.

In the preferred embodiment of the invention, the control interface 18 and the affiliate computer 17 together provide control interface means at the substation operative to switch devices (VCRs 11, switcher 12, C.G. 13, video text combiner 8, anti-copy devices 15 and scrambling encoders 16) in response to signals indicative of the record and playback schedule information from the affiliate computer 17. The need for a control interface 18 to process signals from the affiliate computer 17 in order to control these devices will depend on the particular devices and computer set-up employed.

Preferably the affiliate substation (and most preferably also the control station) includes a character generator (C.G.) 13 (13a at the control station) capable of generating electronically, pages of text and graphics in standard video format for broadcast of the playback schedule, or other information, on the barker channel. An exemplary character generator is the NEXUS SYSTEM I PLAYBACK DECODER CG available from Nexus Display Systems Corp., which encodes graphics and text in N.A.P.L.P.S. format (i.e. North American Presentation Level Protocol Syntax). While the character generator 13a is not necessary at the control station, its inclusion is beneficial to allow for preview and editing of the record and playback schedule information, or other information, sent to the substation for ultimate broadcast on the barker channel. The affiliate computer 17 and/or the network computer 4 and the character generator 13 are also able to store template pages of text or graphics for promotional type information. As shown in FIG. 2, the character generator 13 is connected to the affiliate computer 17. Output from character generator 13 is routed by the switcher 12 to the barker channel output 20.

The record schedule information and playback schedule information generated at the control station is stored as a schedule data file in the network computer 4, (along with data files with program pricing information, tape library information and C.G. information as detailed in the software section hereinafter). Information from these data files required by the substation is then sent via data communications 5 to the affiliate computer 17. Once these data files are at the substation, they may be edited. These data files are processed by software into a N.A.P.L.P.S. format and stored in a N.A.P.L.P.S. data file as the playback schedule for ultimate broadcast on the barker channel. This data file is routed to the character generator 13, where it is encoded into an NTSC video signal for distribution on the barker channel.

The barker channel output 20 from the switcher 12 is routed to a separate channel on the affiliate substation distribution system. The barker channel output 20 is not scrambled to allow for reception by all potential subscribers of pay-per-view. The barker channel, in addition to broadcasting the playback schedule, can be programmed like any of the other pay-per-view channels to include playback of a promotional video/audio from one of the VCRs 11, which can be sent by satellite from the control station. The promotional video/audio can be repeated and interspersed with the character generator produced pages which include the playback schedule, and other information, for example promotional material and pricing, all under the control of the computers 4 and 17. A video disc player may also be used for the promotional video/audio (interspersed with the character generated schedule information) broadcast on the barker channel. The video disc can be distributed on a weekly or other basis by the control station to the substations, for example by overnight courier.

The computer and software control of the system will now be described in further detail, with reference to the flowcharts in FIGS. 3-5. As indicated above, the network computer 4 is used to create the record and playback schedule information for all of the substations. This schedule information is transferred by data communication to each affiliate computer 17. The network computer includes a program monitor, graphics monitor, CPU, and keyboard. Any number of computer systems are acceptable, for instance an MS-DOS microcomputer with an 80286 central processor, 90 MB hard drive, and a CGA display output. A digital graphics card is also included in the computer to preview the character generator information that each substation is to receive and display. The affiliate computer 17 consists of a similar computer system.

Figure 3:
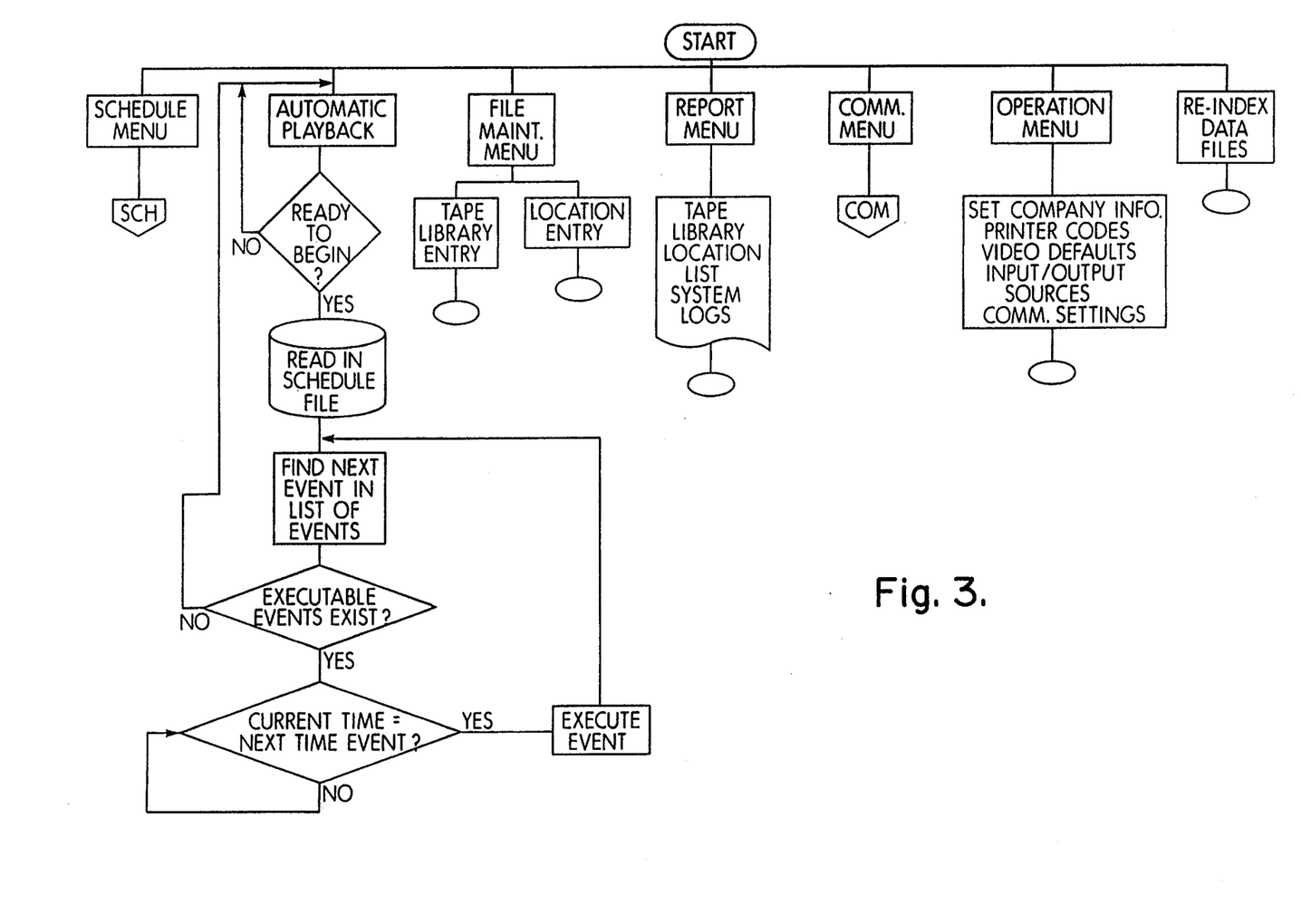
FIG. 3 is a flow chart illustrating the typical menu screens and the processing steps performed by suitably programmed computers to carry out the present invention.
Figure 4:
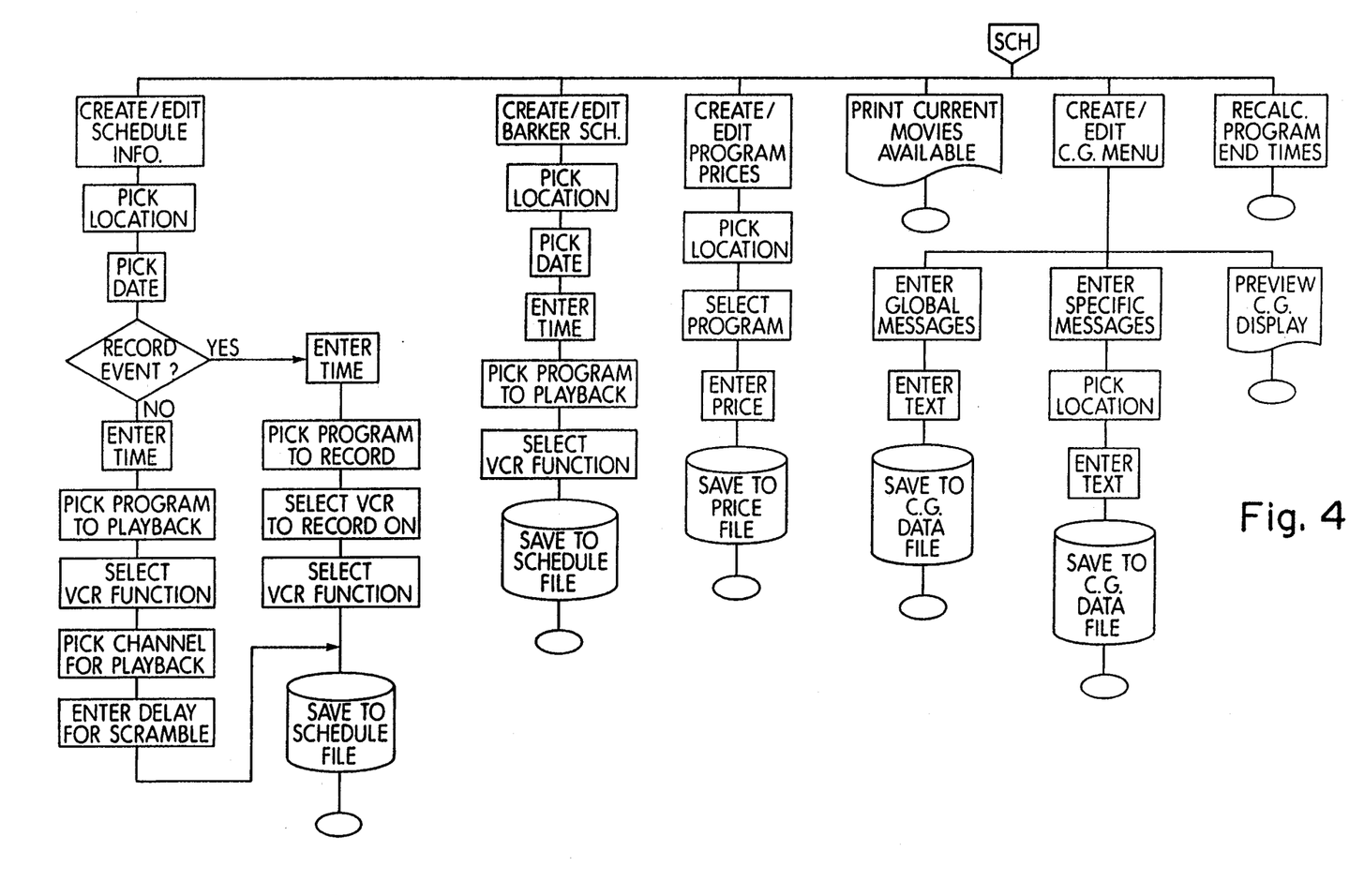
FIG. 4 is a flow chart showing the schedule menu and processing steps from FIG. 3.
Figure 5:
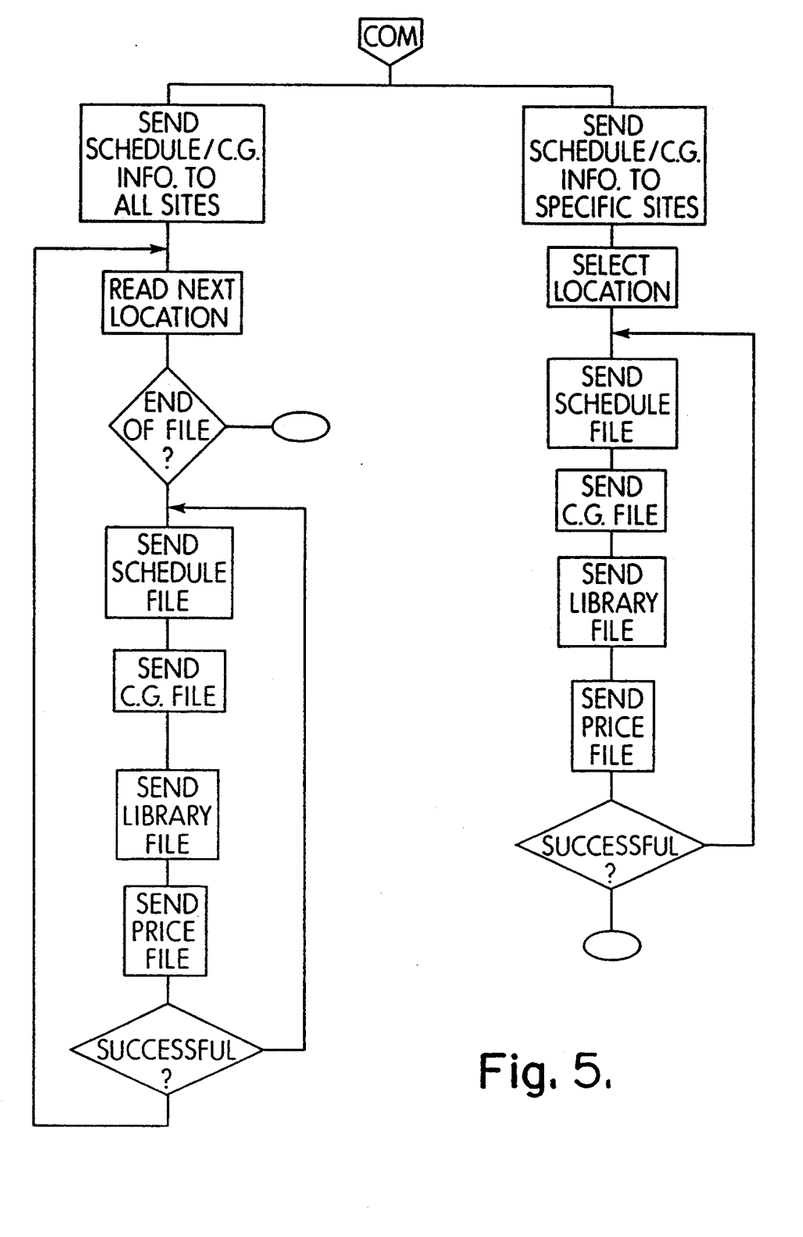
FIG. 5 is a flow chart showing the communication menus and processing steps from FIG. 3.

The software running on the network computer 4 to control the apparatus of the invention is preferably menu driven as shown in the screen flowcharts of FIGS. 3–5 and will be disclosed in this manner. The main menu (FIG. 3) includes the options:
1. Program Scheduling Menu (SCH)
2. Automatic Playback
3. File Maintenance
4. Reporting Menu
5. Communications Menu (COM)
6. Operations Menu
7. Re-Index the Data Files
Q. Quit the Program Options 1, 3 and 5 will be disclosed in more detail hereinafter. The automatic playback option sets the system to begin executing the schedule (record and playback schedule information) that has been previously entered. This option is only used at the substations and can be set to automatically start upon power up of the affiliate computer 17. The reporting menu is used to print reports as indicated in FIG. 3 and can be modified depending on the information desired in report format. The operations menu contains the setup information for both the control station and substations, as indicated in FIG. 3. The Re-Index option rebuilds all indexes for all the data files. This option is run after entering new tape library entries (see below) or after making a significant number of changes to the schedule data file (see below). Quit program quits the program operation and returns to the operating system.

FILE MAINTENANCE MENU

This option is used to enter all the tape library information and information specific to the playback locations. In respect of tape library entry, before a program can be scheduled, it is entered into the tape library. The tape library contains information on each program is to be recorded or played back. The tape library option is selected to enter a new library item or to modify an existing library item. The tape library menu prompts a selection of either Add Item, to enter a new item, or Edit item, to modify an existing entry. The fields in the tape library database are as follows:
Library Number—Automatically assigned to each new entry.
Program Name—Name of program
Supplier—Name of program supplier
Rating—Rating of program (Adult, Restricted, etc.)
Program Length—Full length in hours, minutes and seconds
Header Length—Length of any header that may be included on the tape. Header length is not part of program.
Scramble Delay—Time to delay activation of scrambling encoder after start of program
Description—Program description
PPV Window Open—Earliest playback date allowed for program
PPV Window Close—Latest playback date allowed for program
In Stereo—Stereo or mono audio signal
Closed Captioned—Whether available with closed captions
Anti Tape On—Whether program should activate anti-copy device.

The location entry option is selected to enter or edit information on each of the playback sites (i.e. substations). The information will typically include a location code, location name, address, contact name, modem telephone number, channel capacity (number of PPV playback channels at that location), VCR capacity (number of VCRs at that location), time offset to account for a different time zone from the control station, telephone number to appear on the character generator line with caption stating "For more information, call ### ####", the actual channel numbers used to the PPV channels and the barker channel, and the maximum length allowed to a tape event for each VCR.

SCHEDULE MENU

FIG. 4 illustrates the software for the program schedule menu. Under Create/Edit Schedule Information, all of the scheduling information for record and playback (and live events) for each substation location is entered. The particular location is selected, which causes a calendar screen to appear for selecting the calendar date for which it is desired to create or edit the schedule information. Once the date is selected, a schedule menu screen appears with the list of commands: Add event (adds event to this days schedule), Delete Event (delete specific event), Scroll (scrolls list of events), Print (prints hard copy of schedule), Order (Toggles between displaying events in time order and channel order), and Quit (Returns to calendar screen).

Under Add event, the options Playback, Record, Live Event Video, Switch Video, C.G. Update and Quit are listed. Playback is chosen to playback a tape that has previously been recorded at that location. Here, the time of the playback, the specific deck function, the channel designation and the scramble delay for the start of the program are entered. Record is chosen to record a program that is to be transmitted over satellite or closed circuit system to the substation. Here, the time to start the recording, the program number for the program to record, the VCR to record on and the deck function are entered or selected. Live Event is chosen to enter airing times of live events that are transmitted from the control station. The time for the live event to occur, the input video and audio source to switch to, the output source (or channel), and the name of the live event are entered or selected. Video Switch is chosen to switch an input video and audio source to an output source (channel). The time for the switch to occur, the input video and audio source to switch on, and the output source (or channel) are entered or selected. C.G Update is chosen to update the C.G. display with the most current schedule information. The time for the C.G. update to occur is entered. The C.G. can be updated at any time so that it displays the current schedule information for a desired time period (ex. next 5 hours) or the next set number of events (ex. next 5 programs).

Delete Event allows for deletion of a specific event previously entered under Add Event.

The record and playback schedule information so entered is saved to a data file (schedule file) for transfer to the affiliate computer 17.

The Create/Edit Barker Schedule is the option used to control what is ultimately shown on the barker channel as the playback schedule (which may be interspersed with a promotional video/audio or other promotional information). Under this option, the substation location is chosen and the events that are to occur at that location are entered much as disclosed in respect of the schedule information (i.e. playback a promotional tape, switch to a VCR source etc.). If a barker schedule already exists at a location, the schedule entered at the control computer 4 is not sent to the location to prevent barker schedules at the locations from being erased or overwritten. The barker schedule so generated is saved to the schedule file and constitutes part of the record and playback schedule information.

Under Create/Edit Program Prices, the pay-per-view program prices are input or varied for each substation location. The program prices are stored in a price file containing the location number, program number and program price. In this manner a different price may be entered for the same program at different locations.

The Print Current Programs (Movies) Available option prints a report of the current events that are "active" and playing at each of the substations.

The Recalculate Schedule End Times option recalculates the schedule end times in the schedule file for the programs based on the tape lengths within the library file. If a change is made to a program length after that program has already been scheduled, running this option will update the schedule information so that the end time of the program is calculated on the new tape length.

The Create/Edit Character Generator (C.G.) menu option displays the C.G. menu for adding and editing pages of information that are displayed on the barker channel at each of the substation locations. Data from this menu is stored in the C.G. data file. Entering global C.G. messages allows the operator at the control station to enter messages that will appear at all substations. Within this data entry screen, the operator is prompted for a template name and several lines of text. The template is used as a graphic background to the text. The text may include information about upcoming program and other promotional related material. Entering specific C.G. messages is an option taken to enter messages to appear only at a specific substation. When selected, the location number is selected, after which the data entry screen appears.

Previewing C.G. display is an option which allows the control station operator to preview the C.G. messages before they are sent to the substation locations (assuming the control station is equipped with the character generator 13a).

COMMUNICATIONS MENU

FIG. 5 illustrates the communications menu to transfer information to the substations. In general, when a download of information is sent to a substation location, various files of information are transferred, including the schedule file, library file, price file and C.G. file. This information is collectively referred to herein as record and playback schedule information. In addition to transferring these data files, the clock time is automatically updated at each substation location with a download. Time zones are taken into consideration and a time offset is stored in the location file at the control station. At communication time, the schedule information that is current (present day or beyond) is stripped out and saved to a temporary send file (SND_SCH.dbf). A temporary library file (SND_LIB.dbf) and a temporary price file (SND_PRC.dbf) are created based on the programs that are in SND_SCH.dbf. A further temporary file is created containing all of the current C.G. information (SND_CG.dbf). All the SND files are sent by data communication 5 to the affiliate computer 17 at each substation. The affiliate computer 17 generates the current C.G. information based on the current schedule file and transfers it to the C.G. 13, as previously described. This allows for accurate and timely updates of the C.G. information based on changes that occur within the schedule information.

As shown in FIG. 5, the SND files may be sent to all substation locations, or to only specific substation locations.

In a preferred embodiment of the invention, the substation generates buy rate information on the specific programs played on the pay-per-view channels. This information is transmitted to the control station, which can then alter the record and playback schedule information accordingly (i.e. to maximize buy rates, tailor program content to the particular community needs etc.). The buy rate information can be generated and transmitted in any number of ways, whether in an automated manner which utilizes data communications for transmission, or in a more manual manner which utilizes telecopier or courier transmission.

While the present invention has been described in accordance with its preferred embodiments, it will be evident that persons skilled in the art may make uses and modifications of and departures from the specific embodiments without departing from the inventive concepts of the invention defined in the following claims.

We claim:

1. An apparatus for controlling and delivering television programming to one or more television substations from a control station, wherein each substation transmits television programming on one or more channels in a scrambled form and a program schedule on a separate barker channel over a multi-channel cable or over-the-air distribution system to all of a plurality of remote subscriber receiving locations on a pay-per-view basis, comprising:

a) means for receiving television programming at the substation;

b) a plurality of television program record and playback means at the substation;

c) first audio and video transmitting means at the control station for transmitting television programming to the substation to be recorded on the record and playback means;

d) second audio and video transmitting means at the substation for transmitting the television programming from the record and playback means over the one or more channels to the remote subscriber locations, the second transmitting means including one or both of audio and video signal scrambling means on one or more of the channel outputs;

e) first computer means at the control station for generating record schedule information and playback schedule information;

f) second computer means at the substation;

g) data communications means for transferring signals indicative of the record and playback schedule information between the first and second computer means; and h) control interface means at the substation connected to the second computer means operative to switch the record and playback means, the second transmitting means and scrambling means in response to the signals indicative of the record and playback schedule information from the second computer, wherein
the record and playback means at the substation are controlled in accordance with the record and playback schedule information transmitted from the control station, and
i) means at the substation for selectively enabling descrambling of the television programming to individual subscriber receiving locations in response to a request from the individual subscribers for a particular television program on a pay-per-view basis.

2. The apparatus of claim 1, wherein the second computer means provides a signal indicative of the playback schedule to the second transmitting means for transmission on the separate barker channel.

3. The apparatus of claim 1, wherein the subscriber receiving locations are equipped with one or both of addressable video and audio signal descrambling means, which descrambling means can be selectively enabled by the substation in response to a request for a particular television program on a pay-per-view basis from the subscriber.

4. The apparatus of claim 3, wherein the second transmitting means includes anti-video copying means on the one or more channel outputs, which anti-video copying means are connected to the control interface means for remote control from the second computer means in accordance with the playback schedule information.

5. The apparatus of claim 1, wherein the record and playback means at the substation comprises a plurality of video tape or video cassette recorder and players.

6. The apparatus of claim 1, wherein the first transmitting means at the control station is operative to transmit television programming to the substation by satellite feed.

7. The apparatus of claim 2, which further comprises means for generating text and graphics at one or both of the control station and substation, which means is connected to the one or both of the first and second computer means and is operative to combine text and graphics with the playback schedule for transmission on the barker channel by the second transmitting means.

8. A method of controlling and delivering programming to a television transmission substation from a control station, wherein the substation transmits television programming in a scrambled form on one or more channels and a program schedule on a separate barker channel over a multi-channel cable or over-the-air distribution system to all of a plurality of remote subscriber receiving locations on a pay-per-view basis, comprising the steps of:
a) transmitting television programming from the control station for reception on receiving means at the substation;
b) recording the television programming on one or more audio video record and playback means at the substation;
c) generating record schedule information on a first computer means at the control station;
d) generating playback schedule information on the first computer means at the control station;
e) transmitting data signals indicative of the record and playback schedule information and of the playback schedule from the control station to a second computer means at the substation;
f) controlling the record and playback of the audio video record and playback means at the substation in accordance with the record and playback schedule information transmitted from the control station;
g) transmitting the television programming in a scrambled form from the substation to the subscriber receiving locations in accordance with the playback schedule information on the one or more channels;
h) transmitting information indicative of the playback schedule in the form of one or both of text and graphics from the substation to the subscriber receiving locations on the separate barker channel; and
i) selectively enabling descrambling of the television programming from the substation to individual subscriber receiving locations in response to a request from the individual subscribers for a particular television program on a pay-per-view basis.

9. The method of claim 8, wherein the control station transmits television programming to the substation by satellite feed.

10. The method of claim 8, wherein the control station transmits television programming, record schedule information and playback schedule information to a plurality of substations on an individualized basis.

11. The method of claim 8, wherein the substation generates information indicative of buy rates of the television programming by the subscribers for a given schedule period, transmits that buy rate information to the control station, and wherein the control station varies the record and playback schedule information for the substation for a subsequent schedule period in response to the buy rate information.

* * * * *